United States Patent [19]
Boudet et al.

[11] 4,304,156
[45] Dec. 8, 1981

[54] APPARATUS FOR APPLYING COVERS TO NUCLEAR REACTOR VESSELS

[75] Inventors: Georges Boudet, Tours; Pierre Gibert, Tarbes, both of France

[73] Assignees: Compagnie des Aciers, Outillages et Equipements Industriels-le Roulement, Clamart; Etat Francais, Paris, both of France

[21] Appl. No.: 78,321

[22] Filed: Sep. 24, 1979

[30] Foreign Application Priority Data

Sep. 26, 1978 [FR] France .................... 78 27549

[51] Int. Cl.³ .......................................... B25B 13/50
[52] U.S. Cl. ................................. 81/53.2; 29/240; 81/57.33; 81/57.38
[58] Field of Search ............. 29/240; 81/57.38, 57.15, 81/57.33, 57.35, 57.34, 53.2

[56] References Cited

U.S. PATENT DOCUMENTS

| | | | |
|---|---|---|---|
| 1,788,679 | 1/1931 | Leiter | 81/53.2 |
| 2,523,193 | 9/1950 | Carson | 81/57.2 |
| 3,039,741 | 6/1962 | De Mart | 81/53.2 |

FOREIGN PATENT DOCUMENTS

1321826 2/1963 France .

*Primary Examiner*—Harold D. Whitehead
*Attorney, Agent, or Firm*—Beveridge, De Grandi, Kline and Lunsford

[57] ABSTRACT

Stud bolts are threaded into the body of a nuclear reactor vessel and tensioned by exerting forces on tensioning nuts located on the upper end of the studs. While the studs are under tension, a cover is attached to the vessel by tightening nuts on the studs against the cover. The tensioning nuts are applied to the studs by immobilizing the studs axially and rotationally, and rotating the tensioning nuts with a pair of driven, diametrically opposed striking rollers. External threads on the striking rollers, external threads on the nut and internal threads on the nut all have the same pitch so that the threads on the striking roller remain engaged with the external threads on the nut as the nut moves axially while being threaded onto the immobilized stud.

9 Claims, 2 Drawing Figures

APPARATUS FOR APPLYING COVERS TO NUCLEAR REACTOR VESSELS

BACKGROUND OF THE INVENTION

This invention relates to a device for turning a nut on a stud which attaches the cover to a nuclear reactor vessel.

In certain applications, large bolts or studs are pretensioned during installation, generally by hydraulic tightening devices to improve their resistance to stresses they receive during normal functioning. In the nuclear industry, this is particularly the case with studs for attaching the covers of reactor vessels. Such studs are threaded into the body of the vessel and then held under tension until cover-holding nuts on the studs are tightened downwardly against the vessel cover.

Taking into consideration the large number of studs and the possiblity of dangerous radiations, it is desirable to shorten the time required to connect the studs to the reactor vessel and place them under preliminary tension when closing the cover of the reactor vessel. It is also important to expedite the tensioning and removal of the studs as is required, for example, when the fuel elements are changed.

Apparatus for placing and tensioning studs is known, examples, thereof being described in published French patent application Nos. 2,329,414 and 2,294,795. In such devices, hydraulic tighteners bear against nuts positioned on each stud. In known devices such as those described in the French certificate of utility No. 2,208,756 or the French patent application No. 2,294,795, a laterally toothed pinion engages external circumferential gear teeth on the upper nut. During tightening and unscrewing of the tensioning nut, there is no compensation for the substantial weight of the studs, this weight being borne fully by the threads which connect the tensioning nuts to their respective studs.

An object of the present invention is to permit the tightening and unscrewing of such stud-tensioning nuts without exerting any stress on the threads of the nut. It is also an object to permit unscrewing of the tensioning nut from the stud while the respective stud is being tightened into the body of the reactor vessel.

SUMMARY OF THE INVENTION

According to the invention, an externally threaded surface of the nut is engaged by a rotationally driven striking roller which has threads of the same pitch as the nut. In a preferred embodiment of the invention, means are provided for supporting the weight of the stud and holding it against rotation. Two nut-rotating striking rollers are diametrically opposed on opposite sides of the nut. These rollers are mounted on two arms which are pivotally moved on a mobile chassis by a pneumatic jack. The two striking rollers are rotated in the same direction by a drive motor unit and a drive train which includes two flexible belts, preferably notched belts, each of which passes over a pulley mounted on the pivot axis of the arm which carries the corresponding striking roller. In a preferred embodiment, the device also includes means for holding the striking rollers against rotation so that the nut will become unscrewed when the stud is threaded into the body of the reactor vessel. Striking rollers are preferably driven by a motoreducer which includes a brake operable to effect both tightening and unscrewing of the upper nut when the stud is rotated.

The means for supporting the stud and holding it against rotation advantageously includes a shaft provided at its end with a gripping device which is engageable with and disengageable from the head of the stud. The shaft may have a splined portion which mates with grooves in the head of the stud. The gripping device may be provided with ball bearings which are moved radially outward into engagement with an internal groove in the head of the stud. With this construction the weight of the stud is fully compensated for while the tensioning nut is being rotated, and the stud is held against rotation by the engagment between the splines and grooves.

The nut used in accordance with the invention advantageously has a rather special structure. It includes an externally threaded upper cylindrical skirt with an internal diameter greater than the external diameter of the head of the stud. The external threads conform to the cylindrical grooves of the striking rollers which turn the nut. A lower part of the nut has internal threads which engage the threaded head of the stud and have the same pitch as the external threads of the skirt.

The method of the invention involves the steps of threading the nut onto the stud; rotating the stud to screw it into the body of the vessel while supporting the stud axially to compensate for its weight and while holding the nut against rotation whereby the nut comes unthreaded from the stud; holding the nut on a reduced diameter upper portion of the stud, and rotating the nut to thread it onto the head of the stud while supporting the stud axially to compensate for its weight.

The invention will be understood better after studying a particular exemplary embodiment which is not limiting in any way and which is illustrated in the drawings.

DESCRIPTION OF A PREFERRED EMBODIMENT

Figure 1:
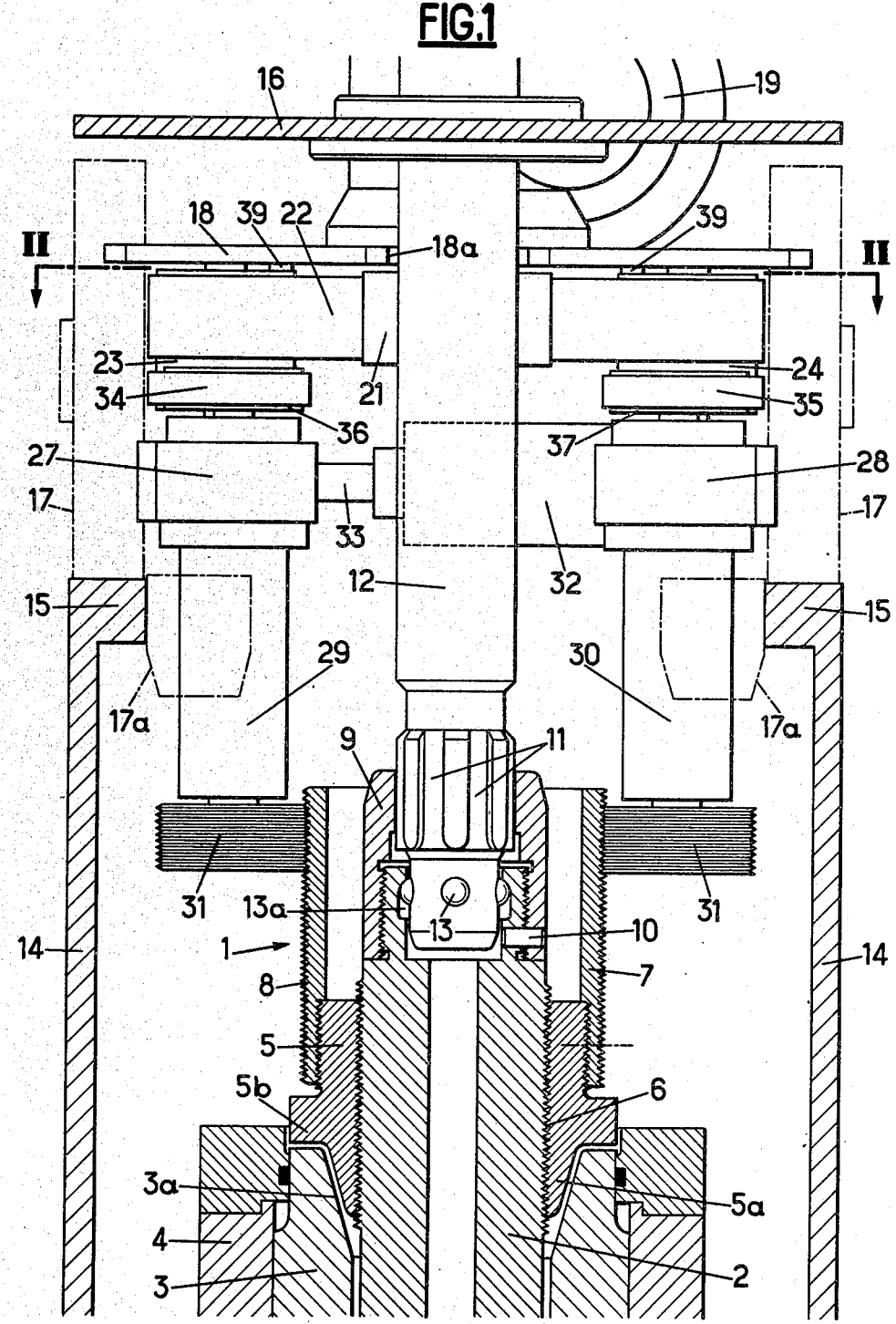
FIG. 1 is an elevational view, partially in section, of an automatic turning device in accordance with the invention, with the stud-tensioning nut shown in the final tightened position on the stud.

The automatic turning device shown in the drawings is operable on an upper nut 1 which is referred to herein as a tensioning nut because it is acted upon by a hydraulic device to exert tensile forces on a stud 2. The stud is threaded into the body of a nuclear reactor vessel, and it carries a nut, located below the illustrated structure, which is tightened and bears against the vessel cover.

The hydraulic tightener which acts upwardly on nut 1 to tension the stud includes a piston 3 shown in FIG. 1, movable into the jacket 4 by hydraulic fluid from a pressurized source. Published French patent application No. 2,329,414 provides more detailed information on the structure of such a hydraulic tightener, and it is incorporated herein by reference together with the publications mentioned above in the Background of the Invention. The upper portion of the piston is recessed at 3a to accommodate the depending conical portion 5a of the lower portion 5 of nut 1. The lower portion 5 of nut 1 has internal threads which engage external threads 6 on the head of the stud 2. The tensioning nut 1 also has an upper cylindrical skirt 7 which is tightly threaded and cotter-pinned to lower portion 5. The skirt 7 is externally threaded at 8 along its entire length and it has an internal diameter which is greater than the external diameter of the head of stud 2.

The head of the stud 2 includes a member 9 which is threaded to the stud and locked thereto by a pin 10. The external circumference of the member 9 is cylindrical and unthreaded. Member 9 has internal splines which mate with external grooves 11 in a splined lower portion of the vertical shaft 12. The shaft 12 is connected to and rotated by a rotating drive mechanism. When this drive mechanism is idle and the shaft 12 is held against rotation, the grooves 11 prevent the stud from rotating. Naturally, when the drive mechanism rotates the shaft 12, the same grooves cause stud 2 to rotate into and out of threaded bores in the vessel body.

The head of the stud 2 is provided with an internal groove 13a which is alignable with ball bearings 13 of a gripping mechanism on the lower end of the stud-rotating and stud-holding shaft 12. This known type of gripping device includes control means for moving the ball bearings radially outwardly into the locking groove 13a to prevent axial movement between the stud 2 and the shaft 12. The control means can be activated automatically to make the ball bearings 13 engage with the locking groove, or to disengage from the locking groove to free the stud 2. When engaged, the gripping device supports the stud 2 by suspending it from the shaft 12.

The hydraulic stud-tensioning device is supported by an annular member (not shown) which surrounds the cover of the reactor vessel. Two circular C-shaped annuli 14 also surround the reactor vessel, one being located radially inside and the other being located radially outside the hydraulic tighteners. The upper horizontal edges 15 of the two annuli 14 serve as rails for chassis 16 of the automatic turning device of the invention, enabling the chassis to be moved around the reactor tank on four rollers 17, only two of which are shown in the drawings. One of the rollers 17 may be driven by a motor to propel the chassis. The rollers 17 are kept in position on the edges 15 by four idler rollers 17a which engage the inner face of the edge 15. Rollers 17a have bevelled edges which facilitates the placement of the entire chassis on the edges 15, such placement being performed by lowering a stud 2 which is engaged with the ball-bearings 13 of the gripping device on shaft 12.

Figure 2:
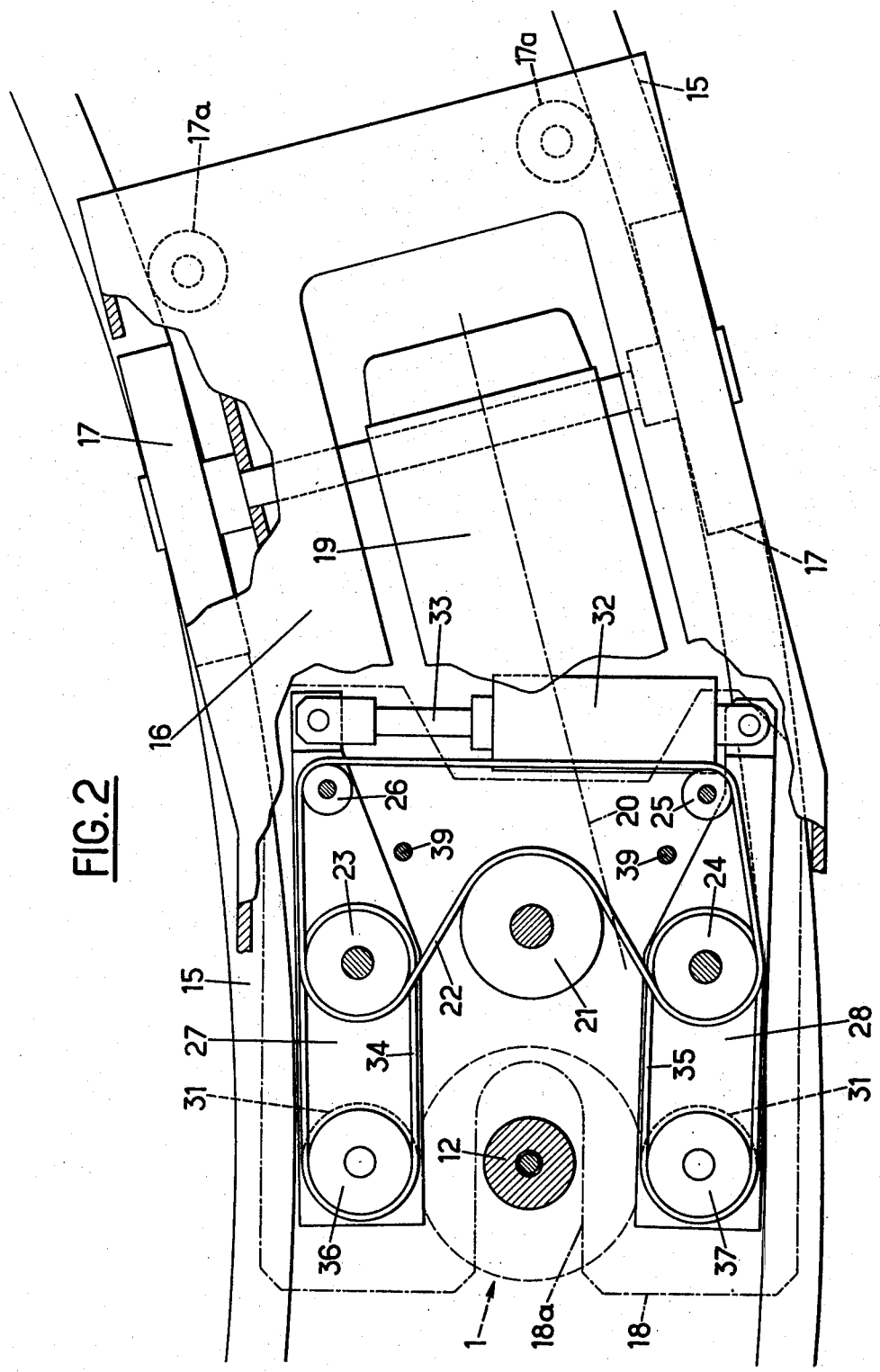
FIG. 2 is a partial plan view of the automatic turning device as seen along the line II—II of FIG. 1.

The automatic turning device of the invention is mounted on a support plate 18 which is immovably affixed to the chassis 16. Support plate 18 has an oblong groove 18a for pin 12 as seen in FIG. 2, and it carries a drive motor unit 19 which includes a drive motor, reduction gearing and a brake. This unit 19 drives a worm gear rotatable about axis 20 in FIG. 2. The worm gear engages a toothed pinion on a notched pulley 21 which is rotatably mounted about an axis which is fixed on the support plate 18. A drive belt 22 is notched on both faces and passes over the notched pulley 21 and two notched pulleys 23 and 24 so that all pulleys 22, 23 and 24 are driven in the same rotary direction. Pulleys 23 and 24 are approximately diametrically opposed relative to the pulley 21. The belt 22 also passes over a fixed-axis notched roller 25 and a tightening notched roller 26 whose axis can be moved to tighten the belt 22. The axes of the pulleys 23 and 24 are stationary relative to the support plate 18. The axles of pulleys 23 and 24 extend downwardly toward the stud 2 where they pivotally support two articulated arms 27 and 28 which lie on opposite sides of the shaft 12. Vertical shafts 29 and 30 extend downwardly from arms 27 and 28, and each of these shafts is provided with an externally threaded striking roller 31. These rollers are located substantially on diametrically opposite sides of the nut 1, and each roller 31 has cylindrical grooves on its circumference having the same pitch and the same shape as the external threads 8 of the stud-tensioning nut 1. It is desirable to provide an external coating of polyurethane on the rollers 31 to limit wear on threads 8.

The opposite ends of the arms 27 and 28 are connected together by a pneumatic jack 32 which has its shaft 33 connected by a pin to arm 27. The cylinder of jack 32 is connected by another pin to arm 28. Actuation of the jack 32 causes arms 27 and 28 to pivot about the fixed axes of pulleys 23 and 24, thereby moving the striking rollers 31 against and away from the external circumference of the nut 1. Two stops 39 on support plate 18 limit the movement of the arms 27 and 28 to ensure that rollers 31 retract equidistantly from the nut 1.

The pulleys 23 and 24 have notched lower portions which are engaged respectively by notched belts 34 and 35. These belts engage notched pulleys 36 and 37 on shafts 29 and 30. From this description, it will be recognized that the striking rollers 31 are rotationally driven by the motor of unit 19 which drives pulley 21, belt 22, pulleys 23 and 24, belts 34 and 35, and shafts 29 and 30.

Various movements of the mechanism are checked by proximity detectors which make entirely automatic functioning possible.

The operation of an automatic device of the invention to position a stud on a cover of a nuclear reactor tank will now be described.

In an initial phase of the handling of the studs, a circular annulus bearing all the hydraulic tightening devices and their tensioning nuts is supported by a transfer mechanism. The studs are successively introduced upwardly into the corresponding hydraulic tightening devices. This lifts the tensioning nuts 1 from an initial rest position where their flanges 5b rested on the pistons 3 of the upper stage of each hydraulic tightener. When lifted, the conical part 5a of the nut 1 covers the end 9 of the head of the stud 2. The chassis of the automatic device of the invention is then driven to a position where the pin 12 of the turning device is axially aligned with a stud 2. The pin 12 is then moved axially to bring the ball bearings 13 into alignment with the internal groove 13a in the head of the stud. The gripping device is activated to move the balls 13 radially outwardly so the stud 2 is supported by the pin 12. Pneumatic jack 32 is actuated to swing the arms 27 and 28 around the axes of pulleys 23 and 24 until the rollers 31 contact the threaded circumference 8 of the skirt 7 of the nut 1. The drive motor 19 is activated, causing the various driving belts 22, 34 and 35 to rotate the rollers 31, thereby threading the nut 1 onto the threaded portion 6 of the stud 2. The rollers 31 maintain their engagement with the threads 8, despite the axial immobilization of the stud, due to the equal pitch of the internal threads of the lower part 5 and the external threads of the skirt 7 of the nut 1. During rotation of the nut 1, the grooves 11 hold the stud 2 against rotation.

When the upper nut 1 is completely tightened, jack 32 is operated to retract the rollers 31 from threads 8. The pin 12 is disengaged from the stud by retracting the ball-bearings 13 of the gripping device. The stud 2 is then supported on piston 3 by flange 5b.

After the foregoing operation is performed on all studs, the annulus which carries all of the hydraulic tighteners and their respective studs is moved by the transfer mechanism to the reactor vessel where it is lowered until the lower ends of the studs come into contact with internally threaded bores in the circumference of the vessel body. The automatic device of the invention is once again moved to positions above each stud where it screws the studs into the tank. This operation is performed by lowering the pin 12, and engaging the ball-bearings 13 of the gripping device with the head of the stud 2. The striking rollers 31 are once again moved into contact with the threads 8 of the upper nut 1 but in this instance the brake of motor unit 19 is engaged to prevent the rollers 31 and nut 1 from rotating. The pin 12 is rotated to screw the stud down into the vessel body. Throughout this operation, the stud is supported by the balls 13 of the gripping device on pin 12. Since the vessel-engaging threads on the lower end of the stud have the same pitch as the threads 6, downward movement of the stud is not impeded by the engagement of the upper nut 1 with the piston 3 of the hydraulic tightener.

When the stud is fully screwed into the body of the reactor vessel, the upper nut 1 is entirely unscrewed from the stud 2 and is resting on the smooth unthreaded external circumference of the member 9 of the stud. The striking rollers 31 remain in contact with the threads 8 and the drive motor unit 19 is operated to rotate the striking rollers 31 and thread the nut 1 onto the stud 2. The upper nut 1 is turned until it reaches a position such as that shown in FIG. 1 where it is not entirely supported by the piston 3 of the hydraulic tightener. A certain amount of play is maintained between nut 1 and piston 3 to avoid stripping the threads of the nut and stud. Finally, the rollers 31 are retracted from threads 8, the balls 13 of the gripping device are disengaged and the chassis is moved on rollers 17 to another location.

After the foregoing sequence of operations is repeated for each stud, all of the hydraulic tightening devices are activated simultaneously to bear against nuts 1 and apply tension to all of the studs 2. The lower hold-down nuts (not shown) on the tensioned studs 2 are tightened against the tank cover. The tensioning nuts 1 are then unscrewed from studs 2 by the rollers 31 of the automatic device of the invention. The transfer mechanism then removes all the hydraulic tighteners from the tank, at which time the nuts 1 rest on the pistons 3. To open the tank cover, these same operations are performed in reverse order.

The special construction of the device of the invention, particularly the cooperation of the striking rollers with the external threads of the upper nut, and the non-rotatable support of the stud on the pin 12, avoids the exertion of stress on the threads of nut 1. The brake torque of the drive motor unit permits the automatic screwing and unscrewing of the upper nut 1, respectively, when the stud is being unscrewed and screwed down without employing additional means. During such operation, there is no frictional engagement between the upper nut 1 and the piston 3 of the hydraulic tightener. The stud threads which engage the vessel body have the same pitch as the stud threads which receive the upper nut.

Persons familiar with the field of the invention will recognize that the disclosed embodiment is susceptible to a wide variety of modifications. Accordingly, it is emphasized that the invention is not limited to the disclosed embodiment but is embracing of a myriad of forms which fall within the spirit of the following claims.

We claim:

1. Apparatus for turning an externally and internally threaded tensioning nut on a stud used to attach the cover to a nuclear reactor tank, comprising, at least one striking roller engageable with the external circumference of the nut, means mounting said roller adjacent said nut and, roller drive means for rotating the striking roller to rotate the nut on the stud, said striking roller having its circumference provided with external threads which have the same profile as the external threads of the nut.

2. The apparatus of claim 1 including means for holding the stud against rotation and supporting its weight when the roller drive means is rotating the striking roller to rotate the nut.

3. The apparatus of claim 1 wherein the means for holding the stud against rotation and supporting it include a shaft provided with a gripping device which engages the head of the stud.

4. The apparatus of claim 3, wherein the shaft has a portion which non-rotatably mates with the head of the stud.

5. The apparatus of claim 1 including means for supporting the striking roller for movement radially of the nut into and out of contact with the circumference of the nut.

6. The apparatus of any one of claims 1, 2 or 5 including two said striking rollers, said striking rollers being diametrically opposed to each other relative to the nut, a pair of pivoted arms supporting said striking rollers, and a fluid jack connected to the arms to move the striking rollers into and out of contact with the circumference of the nut.

7. The apparatus of claim 6 including means for driving the two rollers in the same rotational direction including two notched belts and two notched pulleys which are mounted respectively on the pivot axes of said pivoted arm, and means operable to hold the striking rollers against rotation.

8. The apparatus of claim 1 including a chassis which carries said roller drive means, a pair of rotary shafts extending downwardly from said chassis, two said striking rollers being connected to and supported by said rotary shafts.

9. The apparatus of claim 8 including a brake for holding the rollers against rotation, and means for rotating the stud when said brake is engaged to tighten said nut.

* * * * *